(12) United States Patent
Shimoda

(10) Patent No.: US 10,009,555 B2
(45) Date of Patent: Jun. 26, 2018

(54) IMAGE SENSOR UNIT, PAPER SHEET DISTINGUISHING APPARATUS AND IMAGE READING APPARATUS

(71) Applicant: CANON COMPONENTS, INC., Saitama (JP)

(72) Inventor: Shuuichi Shimoda, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days. days.

(21) Appl. No.: 15/019,148

(22) Filed: Feb. 9, 2016

(65) Prior Publication Data

US 2016/0234445 A1  Aug. 11, 2016

(30) Foreign Application Priority Data

Feb. 10, 2015 (JP) .................................. 2015-024156

(51) Int. Cl.

| H04N 1/04 | (2006.01) |
|---|---|
| H04N 5/33 | (2006.01) |
| H04N 5/369 | (2011.01) |
| H04N 1/00 | (2006.01) |
| F21V 8/00 | (2006.01) |

(52) U.S. Cl.
CPC ............. *H04N 5/332* (2013.01); *G02B 6/001* (2013.01); *H04N 1/00806* (2013.01); *H04N 5/3694* (2013.01)

(58) Field of Classification Search
CPC .. H04N 5/332; H04N 1/00806; H04N 5/3694; G02B 6/001

USPC ....... 358/461, 475, 483, 482, 408, 484, 487, 358/509, 506, 406, 474; 250/234–236, 250/208.1

See application file for complete search history.

(56) References Cited

U.S. PATENT DOCUMENTS

| 5,581,076 A * | 12/1996 | Tabata .................. B29D 11/00 250/208.1 |
| 7,796,310 B2 * | 9/2010 | Hasegawa .......... H04N 1/00681 358/408 |
| 8,797,609 B2 * | 8/2014 | Shimoda ................ G07D 7/121 358/474 |

(Continued)

FOREIGN PATENT DOCUMENTS

| JP | H11088604 A | 3/1999 |
| JP | 2012146285 A | 8/2012 |
| JP | 201378102 A | 4/2013 |

OTHER PUBLICATIONS

Office Action issued in Japanese Appln. No. 2016-021743 dated Jan. 24, 2017.

*Primary Examiner* — Cheukfan Lee

(74) *Attorney, Agent, or Firm* — Rossi, Kimms & McDowell LLP

(57) ABSTRACT

An image sensor unit includes a light emitting element, a light guide that has a substantially rod-like shape and shapes light emitted by the light emitting element into a line, a light condenser that focuses light from an illuminated object, an image sensor that detects the light focused by the light condenser, and a frame in which a light guide housing chamber that houses the light guide and an image sensor housing chamber that houses the image sensor are formed. A correction optical path that extends from the light guide to the image sensor without passing through the light condenser is formed in the frame.

12 Claims, 15 Drawing Sheets

(56) References Cited

U.S. PATENT DOCUMENTS

| | | | |
|---|---|---|---|
| 8,842,344 B2 | 9/2014 | Shimoda | |
| 2005/0088705 A1* | 4/2005 | Okamoto | G02B 6/4298 |
| | | | 358/474 |
| 2012/0113483 A1* | 5/2012 | Mukawa | H04N 1/00342 |
| | | | 358/475 |
| 2012/0307325 A1* | 12/2012 | Tagawa | H04N 1/401 |
| | | | 358/518 |
| 2012/0318961 A1 | 12/2012 | Sawada | |
| 2013/0163057 A1* | 6/2013 | Mihara | H04N 1/028 |
| | | | 358/482 |

* cited by examiner

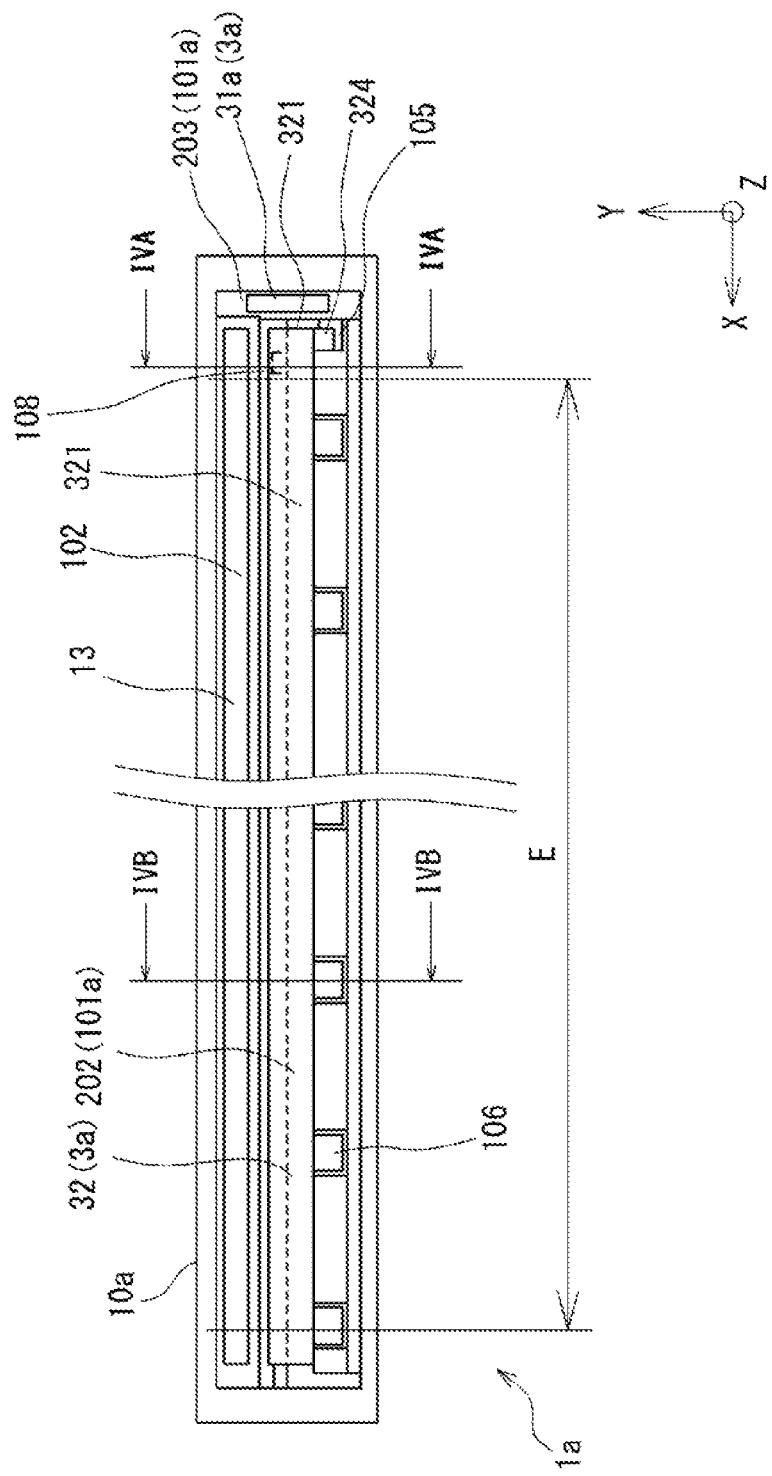

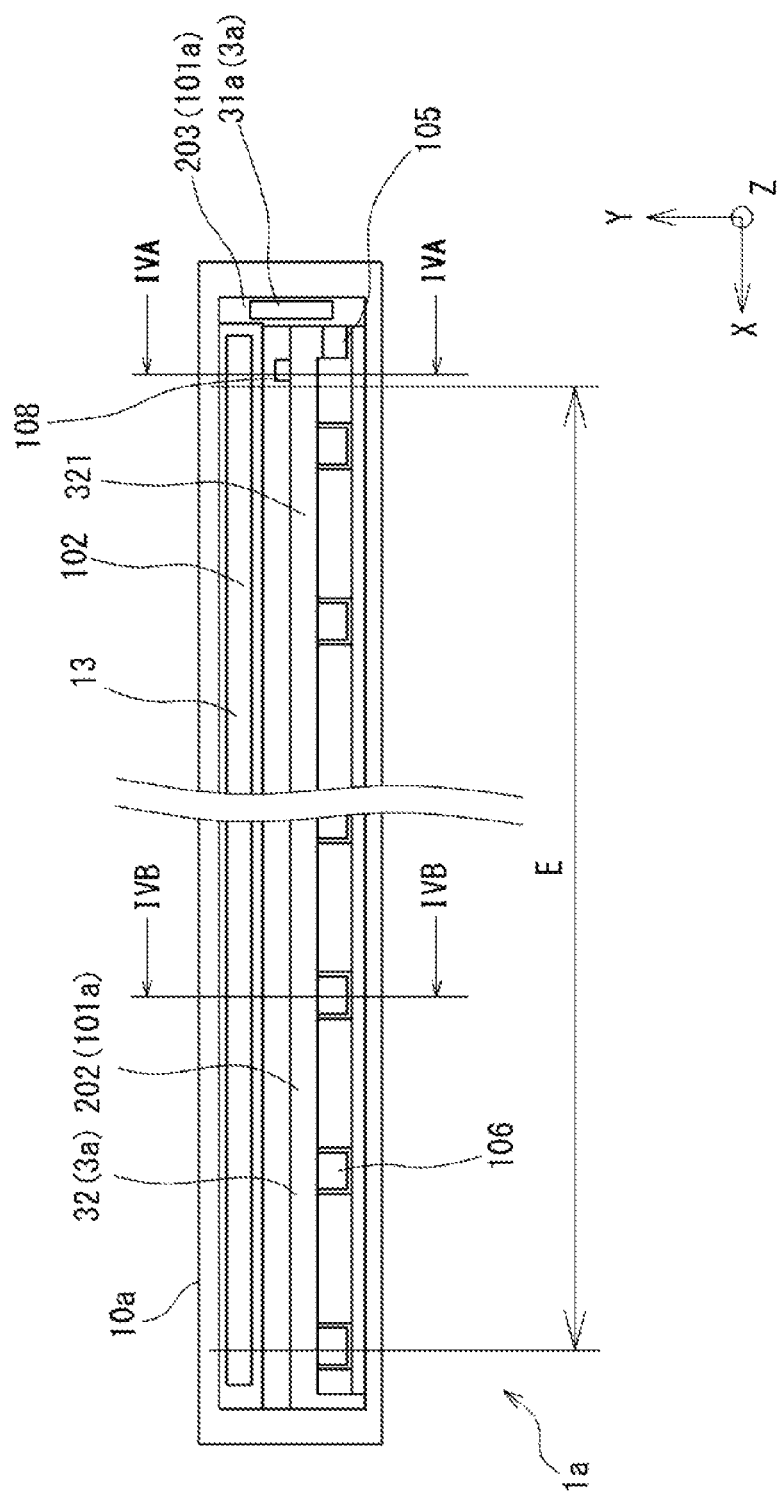

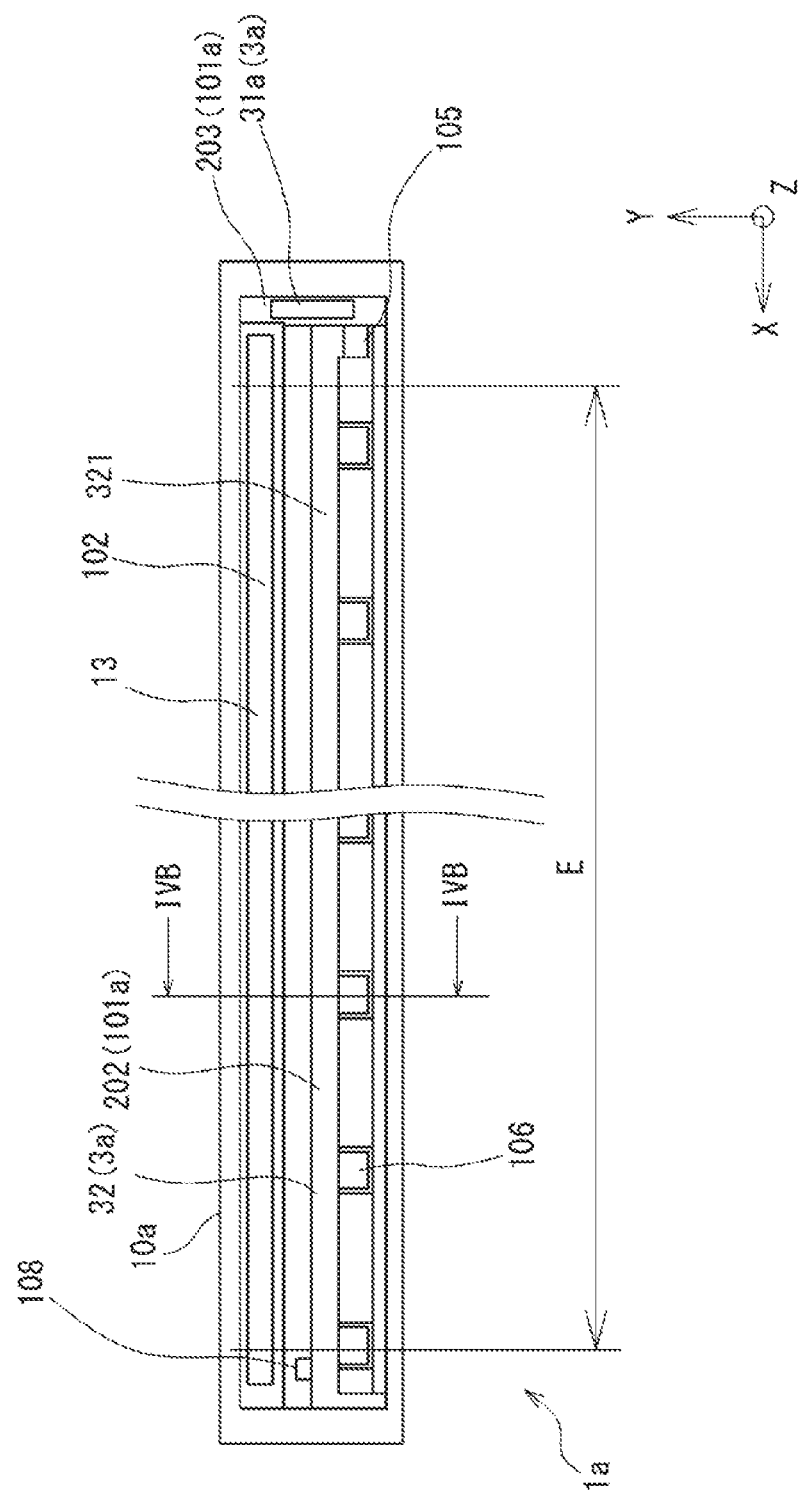

ically showing a configuration example of an image sensor unit
IMAGE SENSOR UNIT, PAPER SHEET DISTINGUISHING APPARATUS AND IMAGE READING APPARATUS

CROSS-REFERENCE TO RELATED APPLICATIONS

This application is based upon and claims the benefit of priority of the prior Japanese Patent Application No. 2015-024156, filed on Feb. 10, 2015, the entire contents of which are incorporated herein by reference.

BACKGROUND OF THE INVENTION

Field of the Invention

The present invention relates to an image sensor unit, a paper sheet distinguishing apparatus and an image reading apparatus. In particular, it relates to an image sensor unit that has a light source that irradiates an object to be illuminated with light, and a paper sheet distinguishing apparatus and an image reading apparatus that are provided with the image sensor unit.

Description of the Related Art

A paper sheet distinguishing apparatus or image reading apparatus incorporates an image sensor unit that reads an illuminated object, such as a bill or an original. The image sensor unit may include a light source that irradiates an object to be illuminated with light and an image sensor that detects light from the illuminated object. The light source deteriorates in irradiation intensity due to aging or the like. As the irradiation intensity of the light emitted from the light source decreases, the brightness of the read image decreases. To avoid this, the irradiation intensity of the light emitted from the light source is corrected to compensate for the decrease of the irradiation intensity of the light due to aging.

According to prior art, as disclosed in Patent Document 1, a white reference is used for such correction. More specifically, the light source emits light toward the white reference, the image sensor detects the light reflected from the white reference, and the irradiation intensity of the light of the light source is corrected based on the intensity of the detected reflected light. However, such an arrangement requires the white reference. In addition, since the correction is based on the light reflected from the white reference, the result of the correction is affected by optical characteristics of the white reference. For example, if the white reference has low reflectance, the intensity of the detected reflected light is also low, and therefore the light quantity required for the correction can be unable to be achieved.

Patent Document 1: Japanese Laid-open Patent Publication No. 2012-146285

SUMMARY OF THE INVENTION

In view of the circumstances described above, an object of the present invention is to enable acquisition of data used for the correction without the need of a member that serves as a white reference.

To attain the object described above, the present invention provides an image sensor unit that irradiates an object to be illuminated with light and detects light from the illuminated object, comprising a light source, a light guide that has a substantially rod-like shape and shapes light emitted by the light source into a line, a light condenser that focuses the light from the illuminated object, an image sensor that detects the light from the illuminated object, and a frame in which a light guide housing chamber that houses the light guide and an image sensor housing chamber that houses the image sensor are formed, wherein an optical path that extends from the light guide housing chamber to the image sensor housing chamber is formed in the frame.

BRIEF DESCRIPTION OF THE DRAWINGS

FIG. 3A is a plan view schematically showing the configuration example of the image sensor unit according to the first embodiment;

FIG. 3B is a diagram showing the image sensor unit shown in FIG. 3A with a light guide omitted;

FIG. 3C is a plan view schematically showing an image sensor unit according to a modification of the first embodiment;

DETAILED DESCRIPTION OF THE PREFERRED EMBODIMENTS

Figure 1:
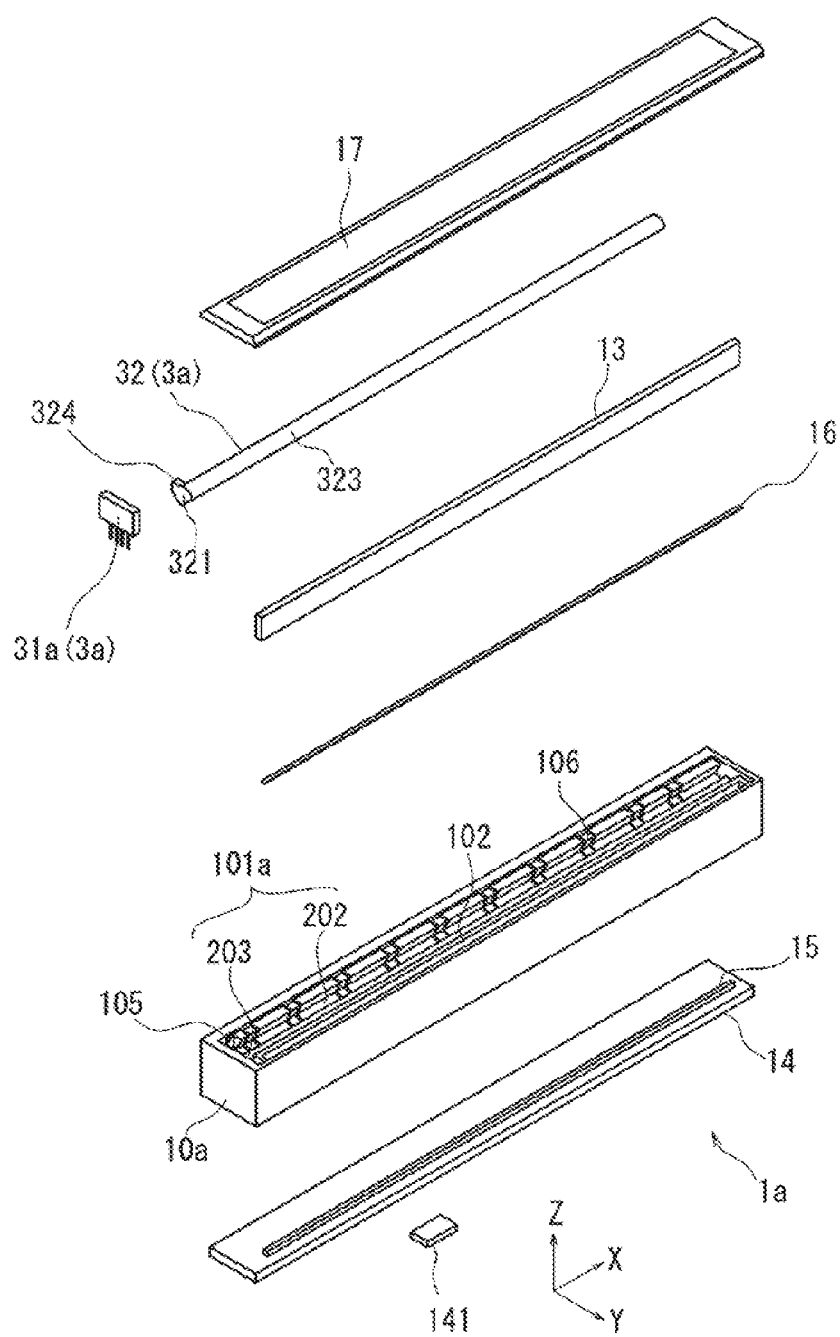
FIG. 1 is an exploded perspective view schematically showing a configuration example of an image sensor unit according to a first embodiment.

In the following, embodiments of the present invention will be described in detail with reference to the drawings. The embodiments of the present invention concerns an image sensor unit, and a paper sheet distinguishing apparatus, an image reading apparatus and an image forming apparatus that are provided with the image sensor unit. The image sensor unit irradiates an object P to be illuminated with light while moving relatively with respect to the object P in a sub-scan direction and reads an image of the illuminated object P from the reflected light or transmitted light. In the present invention, the term "light" means not only visible light but also electromagnetic waves in wavelength bands other than those of the visible light, such as ultraviolet light or infrared light. In the drawings, the three-dimensional directions are denoted by arrows X, Y and Z. The X direction is a main-scan direction of the image sensor unit. The Y direction is the sub-scan direction of the image sensor unit. The Z direction is a vertical direction of the image sensor unit. Regarding the vertical direction, the side where the object P to be illuminated is located is defined as the upper side.

Image Sensor Unit (First Embodiment)

Figure 2:
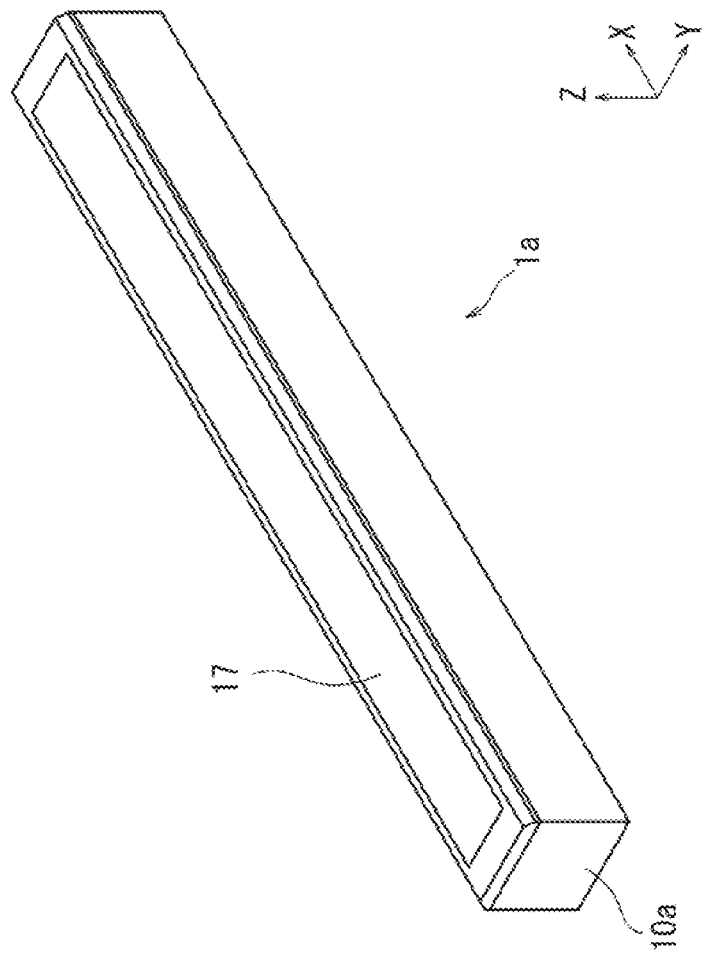
FIG. 2 is an external perspective view schematically showing the configuration example of the image sensor unit according to the first embodiment.
Figure 4A:
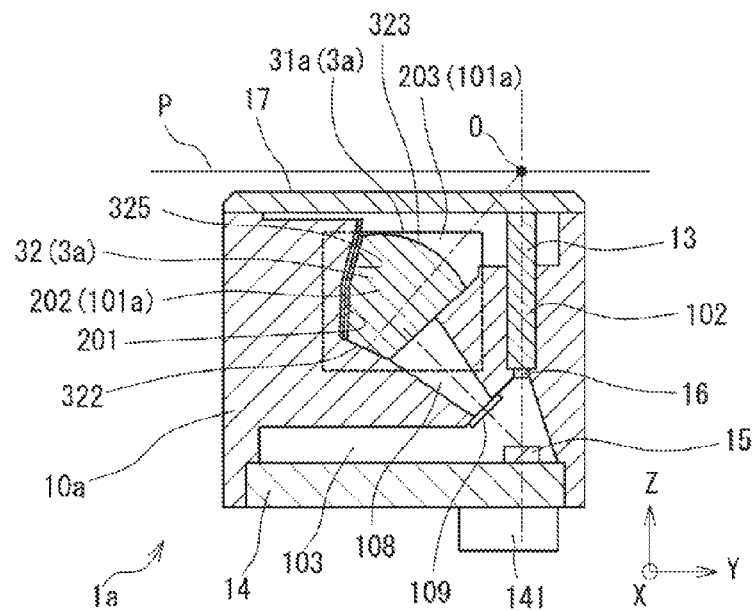
FIG. 4A is a cross-sectional view schematically showing the configuration example of the image sensor unit according to the first embodiment.
Figure 4B:
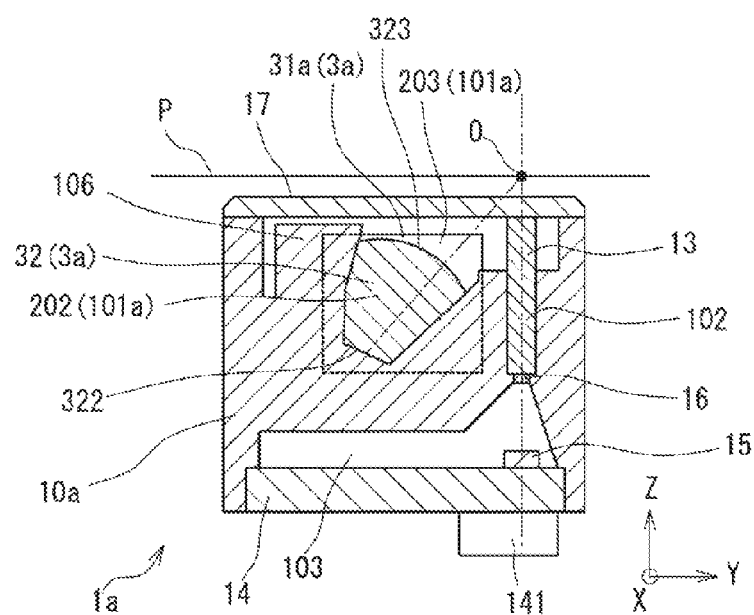
FIG. 4B is a cross-sectional view schematically showing the configuration example of the image sensor unit according to the first embodiment.

A configuration example of an image sensor unit 1a according to a first embodiment will be described with reference to FIGS. 1 to 4B. FIG. 1 is an exploded perspective view schematically showing the configuration example of the image sensor unit 1a according to the first embodiment. FIG. 2 is an external perspective view schematically showing the configuration example of the image sensor unit 1a according to the first embodiment. FIG. 3A is a plan view of the image sensor unit 1a. FIG. 3B is a plan view of the image sensor unit 1a shown in FIG. 3A with a light guide omitted. FIG. 4A is a cross-sectional view taken along the line IVA-IVA in FIG. 3A. FIG. 4B is a cross-sectional view taken along the line IVB-IVB in FIG. 3A.

As shown in FIGS. 1 to 3B, the whole of the image sensor unit 1a has a substantially rod-shaped configuration that is elongated in the main-scan direction. The image sensor unit 1a has a linear light source 3a, a light guide 32, a light condenser 13, an image sensor substrate 14, an image sensor 15, a filter 16 and a cover member 17.

The linear light source 3a includes a light emitting element 31a and the light guide 32. The light emitting element 31a may be a point-shaped light source that emits light of predetermined colors (red (R), green (G), blue (B), infrared light (Ir) and ultraviolet light (UV)), for example. For example, the light emitting element 31a may be an LED package having LED elements that emit the light of the colors (wavelength ranges) described above. The colors (wavelength ranges) of the light emitted by the light emitting element 31a are not limited to the combination described above. For example, the light emitting element 31a may emit only light of one color. The colors of the light emitted by the light emitting element 31a may be a combination of visible light (red (R), green (G) or blue (B)) and infrared light (Ir) or a combination of visible light and ultraviolet light (UV). As a further alternative, the colors of the light emitted by the light emitting element 31a may be a combination of infrared light and ultraviolet light.

The light guide 32 is an optical member that shapes light emitted from the light emitting element 31a into a line (linear light source). The light guide 32 has a substantially rod-shaped configuration elongated in the main-scan direction as a whole. The light guide 32 is made of a transparent resin material, such as acrylic resin, and is integrally formed by injection molding or the like. An end face of the light guide 32 in the longitudinal direction (main-scan direction) includes a light incident surface 321 on which light emitted by the light emitting element 31a is incident. Side surfaces of the light guide 32 include a light diffusing surface 322 (see FIGS. 4A and 4B) and a light emission surface 323. The light diffusing surface 322 is a surface intended to diffuse light incident at the light incident surface 321 and has a band-like shape elongated in the main-scan direction. On the light diffusing surface 322, a dot pattern that diffuses light through diffuse reflection is printed, for example. The light emission surface 323 is a surface from which the light incident at the light incident surface 321 is emitted toward the object P to be illuminated. The light emission surface 323 has a band-like shape elongated in the main-scan direction so as to shape the light emitted by the light emitting element 31a into a line (linear light source). The light guide 32 is provided, at a longitudinal end thereof, with an engagement portion 324 for positioning the light guide 32 on a frame 10. The engagement portion 324 may be a projection that protrudes in a direction (sub-scan direction) perpendicular to the longitudinal direction, for example.

The light condenser 13 is an optical member that focuses the light from the illuminated object P (reflected light or transmitted light) onto a surface of the image sensor 15 (described later). The light condenser 13 may be a known common rod lens array (micro lens array), for example. The common rod lens array includes a plurality of imaging elements (rod lenses) of an erect equal magnification imaging type linearly arranged in the main-scan direction. The configuration of the light condenser 13 is not particularly limited, and the light condenser 13 can have any configuration in which imaging elements are linearly arranged. For example, the light condenser 13 may have a configuration that includes a plurality of rows of imaging elements.

The image sensor substrate 14 is a circuit board having a substantially rectangular shape elongated in the main-scan direction. The image sensor 15 is provided on an upper surface of the image sensor substrate 14. A connector 141 for connection to the outside (such as a paper sheet distinguishing apparatus) is mounted on a lower surface of the image sensor substrate 14. Furthermore, a memory that stores correction data used for correction of the irradiation intensity of the light from the light emitting element 31a is mounted on the image sensor substrate 14. The memory may be any of various known nonvolatile memories.

The image sensor 15 detects the light focused by the light condenser 13 (reflected light or transmitted light from the illuminated object P) and converts the light into an electric signal. The image sensor 15 is mounted with a light receiving surface thereof facing upward so that the image sensor 15 can detect the reflected light or transmitted light from the light condenser 13. The image sensor 15 may be an image sensor IC array, for example. The image sensor IC array includes a plurality of image sensor ICs linearly arranged on the upper surface of the image sensor substrate 14 in the longitudinal direction (main-scan direction). The image sensor IC has a plurality of light receiving elements (photoelectric conversion elements) linearly arranged. The image sensor IC is oriented and mounted in such a manner that the direction of arrangement of the light receiving elements is parallel with the longitudinal direction (main-scan direction) of the image sensor substrate 14. The number of image sensor ICs and the number of light receiving elements provided in the image sensor IC are determined according to the reading resolution of the image sensor unit 1a. The configuration of the image sensor 15 is not particularly limited, and the image sensor 15 can have any configuration that includes a plurality of image sensor ICs arranged in the longitudinal direction of the image sensor substrate 14. For example, the image sensor 15 may include a staggered arrangement of a plurality of rows of image sensor ICs. The image sensor ICs forming the image sensor IC array serving as the image sensor 15 may be any of various known image sensor ICs.

The connector 141 is mounted on the lower surface of the image sensor substrate 14. The image sensor and the light emitting element 31a of the linear light source 3a provided on the image sensor substrate 14 are electrically connected to the outside via the connector 141. The configuration of the connector 141 is not particularly limited, and the connector 141 can have any configuration as far as the connector 141 can connect the image sensor unit 1a to a predetermined device (circuit board, for example) such as the paper sheet distinguishing apparatus in such a manner that electric power or electric signals can be transmitted and received therebetween.

The filter 16 may be an ultraviolet cut filter. The functionality of the filter 16 will be described later. Although FIGS. 4A and 4B shows the filter 16 as being provided between the light condenser 13 and the image sensor 15, the position of the filter 16 is not limited to the position shown in FIGS. 4A and 4B. For example, the filter 16 may be provided between a cover member 17 and the light condenser 13. What is essential is that the filter 16 is provided on the optical path extending from the illuminated object P to the image sensor 15.

The frame 10 is a housing of the image sensor unit 1a. The frame 10 has a rectangular shape elongated in the main-scan direction in top view. The frame 10 is made of a resin material that is colored black to have a light blocking property. The resin material may be polycarbonate, for example. Inside the frame 10, a linear light source housing chamber 101a that houses the linear light source 3a, a light condenser housing chamber 102 that houses the light condenser 13, and an image sensor housing chamber 103 that houses the image sensor substrate 14.

The linear light source housing chamber 101a has a light guide housing chamber 202 that houses the light guide 32 of the linear light source 3a and a light emitting element housing chamber 203 that houses the light emitting element 31a of the linear light source 3a. The light guide housing chamber 202 of the linear light source housing chamber 101a is a space that is elongated in the main-scan direction and is open at the upper side. An engagement counterpart portion 105, with which the engagement portion 324 of the light guide 32 is engaged, is provided in the vicinity of an end of the light guide housing chamber 202 in the main-scan direction. When the engagement portion 324 of the light guide 32 is a projection that protrudes in the sub-scan direction as described above, the engagement counterpart portion 105 may be a recess in which the engagement portion 324 of the light guide 32 can be engaged (fitted). Once the engagement portion 324 of the light guide 32 is engaged with the engagement counterpart portion 105, the light guide 32 is positioned with respect to the frame 10 in the main-scan direction.

The frame 10 is provided with a holding piece 106 that holds the light guide 32 on one side of the light guide housing chamber 202 in the sub-scan direction. The holding piece 106 is a tongue-like structure that is elastically deformable. The holding piece 106 biases the light guide 32 housed in the light guide housing chamber 202 downward and toward the other side in the sub-scan direction. As a result, once housed in the light guide housing chamber 202, the light guide 32 is pressed in a state of being biased against the inner surface on the other side in the sub-scan direction (the surface parallel to the main-scan direction) and the bottom surface (the surface facing upward) of the light guide housing chamber 202. In this way, the light guide 32 is positioned and held with respect to the frame 10 in the sub-scan direction and the vertical direction.

The light emitting element housing chamber 203 of the linear light source housing chamber 101a is provided in the vicinity of an end of the linear light source housing chamber 101a in the longitudinal direction (main-scan direction) on the outer side of the light guide housing chamber 202 in the longitudinal direction. The light emitting element housing chamber 203 connects to the light guide housing chamber 202 so that the light incident surface 321 of the light guide 32 can be irradiated with the light emitted by the light emitting element 31a. To this end, the light emitting element 31a housed in the light emitting element housing chamber 203 is opposed to the light incident surface 321 of the light guide 32 housed in the light guide housing chamber 202. The light emitting element housing chamber 203 also connects to the image sensor housing chamber 103 at the bottom thereof through a through-hole that penetrates the bottom in the vertical direction. A terminal (lead frame) of the light emitting element 31a housed in the light emitting element housing chamber 203 is drawn into the image sensor housing chamber 103 through the through-hole and is connected (soldered, for example) to the image sensor substrate 14.

As with the light guide housing chamber 202, the light condenser housing chamber 102 is also a space that is elongated in the main-scan direction and is open at the upper side. The light condenser housing chamber 102 can house the light condenser 13 in a posture in which the optical axis thereof extends in the vertical direction (that is, a posture in which the light condenser 13 faces toward a reading line O of the illuminated object P (see FIGS. 4A and 4B)). The light condenser 13 housed in the light condenser housing chamber 102 is fixed to the frame 10 with an adhesive, such as an ultraviolet curable adhesive. The light guide housing chamber 202 has an opening at the bottom thereof through which the light condenser housing chamber 102 connects to the image sensor housing chamber 103. The opening forms an optical path extending from the light condenser 13 to the image sensor 15. The opening is a through-hole that penetrates the bottom of the light guide housing chamber 202 in the vertical direction and has a slit-like shape elongated in the main-scan direction in plan view.

The image sensor housing chamber 103 is provided in a lower part of the interior of the frame 10 under the light guide housing chamber 202, the light condenser housing chamber 102 and the light emitting element housing chamber 203 (see FIGS. 4A and 4B). The image sensor housing chamber 103 is a space that is open at the lower side, and the image sensor substrate 14 with the image sensor 15 mounted thereon can be housed in the image sensor housing chamber 103 from below. The image sensor substrate 14 housed in the image sensor housing chamber 103 is fixed to the frame 10 by swaging a boss or the like (not shown) provided on the frame 10. As shown in FIGS. 4A and 4B, once the image sensor substrate 14 is housed in the image sensor housing chamber 103, the image sensor 15 mounted on the image sensor substrate 14 is opposed to the lower face of the light condenser 13 through an opening formed in the bottom of the light condenser housing chamber 102.

The cover member 17 is provided on the upper side of the frame 10. The cover member 17 is a transparent plate-shaped member and is made from a glass plate, for example. The cover member 17 has a function of maintaining the distance between the light guide 32 and the light condenser 13 and the illuminated object P to be suitable for reading and a function of preventing a foreign matter, such as dust, from entering the frame 10. If the image reading apparatus or the like that incorporates the image sensor unit 1a has a platen glass on which the object P to be illuminated is mounted, the cover member 17 can be omitted.

(Operation of Image Sensor Unit)

Next, an operation of the image sensor unit 1a will be described. To read the illuminated object P, the LED elements of different colors and infrared light of the light emitting element 31a are successively turned on. The light emitted by the light emitting element 31a enters the light guide 32 at the light incident surface 321 thereof and propagates in the light guide 32 by being diffused by the light diffusing surface 322, for example. The light having propagated through the light guide 32 is emitted in a line shape from the light emission surface 323 of the light guide 32 toward the reading line O of the illuminated object P (see FIGS. 4A and 4B). The reflected light from the reading line O of the illuminated object P is focused on the surface of the image sensor 15 by the light condenser 13. The image sensor 15 detects the optical image focused by the light condenser 13 and converts the optical image into an electric signal. The image sensor unit 1a cyclically repeats in a short time the operation of irradiating the object P to be illuminated and detecting the reflected light while moving in the sub-scan direction with respect to the illuminated object P. Through this operation, the image sensor unit 1a reads a predetermined pattern (a hologram, for example) formed on the illuminated object P as a visible light image. In addition, the image sensor unit 1a reads an infrared light image of the illuminated object P and reads fluorescence from a fluorescent material on the illuminated object P as an ultraviolet light image.

As described above, the filter 16 is provided on the optical path from the illuminated object P to the image sensor 15. In this embodiment, the filter 16 is an ultraviolet cut filter. Ultraviolet light emitted by the light emitting element 31a is shaped into a line by the light guide 32 and emitted toward the reading line O of the illuminated object P. If a fluorescent material that is excited by ultraviolet light is provided on the illuminated object P (for example, a character or figure is drawn in a fluorescent material on the illuminated object P), the fluorescent material on the illuminated object P is excited by the ultraviolet light to emit fluorescence. The fluorescence emitted by the fluorescent material on the illuminated object P is focused on the image sensor 15 by the light condenser 13. In this way, the image sensor 15 can read the ultraviolet light image by detecting the fluorescence. The ultraviolet light reflected from the surface of the illuminated object P is cut by the filter 16, which is an ultraviolet cut filter, and therefore is not incident on the image sensor 15.

Although the ultraviolet cut filter is used as the filter 16 in this embodiment, the filter 16 is not limited to the ultraviolet cut filter. What is essential is that, in the configuration in which the light emitting element 31a irradiates the object P to be illuminated with excitation light in a wavelength range and the fluorescence emitted from the illuminated object P as a result of excitation by the excitation light, a filter that transmits the fluorescence but cuts the excitation light is used.

The image sensor unit 1a can perform transmission reading if a light source device or another image sensor unit 1a is disposed on the opposite side of the object P to be illuminated. In such a case, the light emitted by the light source device or the other image sensor unit 1a is transmitted through the illuminated object P and focused on the surface of the image sensor 15 by the light condenser. The image sensor 15 detects the optical image focused by the light condenser 13 and converts the optical image into an electric signal (image signal). The image sensor unit 1a cyclically repeats in a short time the operation of detecting the light emitted by the light source device or the other image sensor unit 1a and transmitted through the illuminated object P while moving with respect to the illuminated object P in the sub-scan direction.

As shown in FIGS. 3A and 3B, the image sensor unit 1a has an effective reading range E. In FIGS. 3A and 3B, the cover member 17 is not shown for the visibility of the internal structure. In FIG. 3B, the light guide 32 is also not shown. The effective reading range E is a range in which the image sensor unit 1a actually performs reading of the illuminated object P. That is, the image sensor unit 1a reads the light focused on the image sensor 15 in the effective reading range E as an image of the illuminated object P, converts the light into an electric signal (image signal) and outputs the electric signal. However, the image sensor 15 extends beyond the effective reading range E. For example, the dimension of the image sensor 15 in the longitudinal direction (main-scan direction) is greater than the dimension of the effective reading range E (the dimension in the main-scan direction). The image sensor 15 is provided so that the light receiving elements cover the entire effective reading range E. Furthermore, the image sensor 15 is provided in such a manner that the longitudinal ends thereof are located outside the effective reading range E, and there is a light receiving element in regions outside the effective reading range E (regions close to the ends of the image sensor 15 on the outer sides in the main-scan direction). The image sensor 15 also detects light incident on the light receiving element and outputs an electric signal in response to the intensity of the detected light in the regions outside the effective reading range E.

(Correction Optical Path)

As shown in FIGS. 3A to 4A, a correction optical path 108 is provided in the frame 10. The correction optical path 108 is used to correct the irradiation intensity of the light emitted by the light emitting element 31a. The correction optical path 108 will now be described. The correction optical path 108 is an optical path extending from the light guide housing chamber 202 to the image sensor housing chamber 103. The correction optical path 108 may be provided by a through-hole that connects the light guide housing chamber 202 and the image sensor housing chamber 103 to each other, for example. As shown in FIGS. 3A and 3B, the correction optical path 108 is provided outside the effective reading range E. For example, in plan view, the correction optical path 108 is provided between the effective reading range E and the light emitting element housing chamber 203. The opening of the correction optical path 108 into the light guide housing chamber 202 is provided at a position where the opening is covered with the side surface of the light guide 32. The correction optical path 108 is not provided in the effective reading range E in plan view. In this embodiment, the frame 10 of the image sensor unit 1a includes, outside the effective reading range E, the correction optical path 108 that extends from the light guide 32 to the image sensor 15 without passing through the filter 16.

The correction optical path 108 may be blocked by an optical path lid 109. The optical path lid 109 is made of a material having high transmittance of the light (visible light, infrared light and ultraviolet light in this embodiment) emitted by the light emitting element 31a. The material may be glass, for example. If the correction optical path 108 is blocked by the optical path lid 109, a foreign matter, such as dust, can be prevented from entering the correction optical path 108 and the light guide housing chamber 202. Alternatively, the optical path lid 109 may be a member whose transmittance of light can be controlled. For example, the optical path lid 109 may be a liquid crystal shutter. In that case, the liquid crystal shutter is opened to perform correction, and is closed at other times (such as during use of the image sensor unit 1a). In this way, occurrence of stray light can be prevented, and the light having passed through the correction optical path 108 can be prevented from being incident on any light emitting element of the image sensor 15 in the effective reading range E. If the optical path lid 109 is the liquid crystal shutter, the correction optical path 108 can be provided in the effective reading range E. Furthermore, the optical path lid 109 which does not have a filtering function (a function such as blocking or reducing a light in a specific wavelength range) is provided with respect to the light emitted by the light emitting element 31a. For example, the liquid crystal shutter switches transmittance of light emitted by the light emitting element 31a, however, the liquid crystal shutter does not block or reduce the light in a specific wavelength range.

The light emitted from the side surface of the light guide 32 housed in the light guide housing chamber 202 passes through the correction optical path 108 and is directly incident on the image sensor without passing through the filter 16. As described above, the opening of the correction optical path 108 into the light guide housing chamber 202 is provided at a position where the opening is covered with the side surface of the light guide 32. As a result, the light emitted by the light emitting element 31a enters the correction optical path 108 via the light guide 32.

In the configuration in which such a correction optical path 108 is provided, the irradiation intensity of the light from the light emitting element 31a can be corrected based on the result of detection of the light having passed through the correction optical path 108 by the image sensor 15. For example, the light emitting element 31a decreases in irradiation intensity of light due to aging. The irradiation intensity of the light emitting element 31a (electric power input to the light emitting element 31a) is corrected to compensate for the decrease of the irradiation intensity due to aging. According to prior art, the irradiation intensity of the light emitting element 31a is corrected based on measurement of the intensity of the reflected light with respect to a white reference. Therefore, the white reference is needed for the correction. According to this embodiment, however, the irradiation intensity of the light emitting element 31a can be corrected based on measurement of the intensity of the light having passed through the correction optical path 108 and is incident on the image sensor 15, so that the white reference is unnecessary.

FIG. 3C is a diagram showing a modification of the first embodiment, which corresponds to FIG. 3B. As shown in FIG. 3C, the correction optical path 108 may be provided on the opposite side to the light emitting element 31a. Alternatively, correction optical paths 108 may be provided at both the ends in the longitudinal direction. If correction optical paths 108 are provided at both ends in the longitudinal direction, shading compensation can be performed.

As shown in FIG. 4A, the light guide 32 preferably has a light reflection surface 325 that reflects light toward the correction optical path 108. More specifically, the light reflection surface 325 is a side surface of the light guide 32 in the vicinity of an end of the light guide 32 in the longitudinal direction (a part of the side surface of the light guide 32 that is located outside the effective reading range E when the light guide 32 is housed in the light guide housing chamber 202) that is opposed to the surface that blocks the correction optical path 108. It is only necessary that the light reflection surface 325 has such a surface property as to produce diffuse reflection of light. For example, the light reflection surface 325 may be provided by applying a paint that produces diffuse reflection of light to the surface or forming a prism pattern that produces diffuse reflection of light on the surface. With such an arrangement, the intensity of the light that passes through the correction optical path 108 and is incident on the image sensor can be increased. Therefore, the accuracy of the correction can be improved. As an alternative to or in addition to the light reflection surface 325 of the light guide 32, a light reflection surface 201 may be formed in the inner surface of the light guide housing chamber 202 of the frame 10. In that case, the light reflection surface 201 is formed in the inner surface of the light guide housing chamber 202 of the frame 10 at a part opposed to the correction optical path 108 outside the effective reading range E. Such an arrangement also has the same advantages as the arrangements described above.

The correction of the irradiation intensity of ultraviolet light can be improved in accuracy for the following reason. If the filter 16 (ultraviolet cut filter) is provided on the optical path from the illuminated object P to the image sensor 15, the image sensor 15 cannot detect the ultraviolet light reflected from the white reference (illuminated object P). In view of this, according to prior art, a white reference with a fluorescent material (white reference to which a fluorescent paint that is excited by ultraviolet light to emit fluorescence is applied) is used, and the irradiation intensity of the ultraviolet light from the light emitting element 31a is measured by detecting the fluorescence emitted by the fluorescent material of the white reference. However, in general, the characteristics of the fluorescent material deteriorate with time, so that the intensity of the fluorescence (therefore the intensity of the ultraviolet light) cannot be steadily measured. In addition, once some time has elapsed since the image sensor unit 1a starts being used, it is difficult to obtain the fluorescent material having the same characteristics as the fluorescent material used for the initial correction at the time of manufacture of the image sensor unit 1a, for example.

According to this embodiment, the light receiving element of the image sensor 15 at the position corresponding to the correction optical path 108 outside the effective reading range E receives the light (ultraviolet light) that is emitted by the light emitting element 31a and passes through the correction optical path 108. The ultraviolet cut filter is not provided on the correction optical path 108 and the optical path from the correction optical path 108 to the image sensor 15. Therefore, the light emitted by the light emitting element 31a passes through the light guide 32 and the correction optical path 108 and is incident on the image sensor 15 without passing through the filter 16 (ultraviolet cut filter). With such a configuration, the irradiation intensity of the ultraviolet light emitted by the light emitting element 31a can be directly measured. Therefore, the measurement is not affected by the variable characteristics or aging of the fluorescent material of the white reference. Therefore, the irradiation intensity of the ultraviolet light from the light emitting element 31a can be accurately measured compared with the configuration in which the fluorescence from the white reference is measured. The measurement result can be reflected in the correction of the irradiation intensity of the ultraviolet light from the light emitting element 31a, and therefore, the correction is also accurately made. In addition, there is no need to secure the fluorescent material having the same characteristics as the fluorescent material used for the initial correction.

The correction of the irradiation intensity of infrared light can also be improved in accuracy for the following reason.

The white reference used for the correction generally tends to transmit infrared light. As a result, the intensity of the infrared light incident on the image sensor 15 decreases, and it is difficult to ensure the irradiation intensity required for the correction. According to this embodiment, however, the irradiation intensity of the infrared light from the light emitting element 31a can be corrected by using the result of measurement of the irradiation intensity of the infrared light that passes through the light guide 32 and the correction optical path 108 and is incident on the image sensor 15. Therefore, the correction can be made based on the infrared light of high irradiation intensity compared with the configuration in which the irradiation intensity of the infrared light reflected from the white reference is used. As a result, the accuracy of the correction can be improved.

The irradiation intensity of visible light can also be corrected without using the white reference. Therefore, the correction for the visible light is also not affected by the optical characteristics (such as transmittance) of the white reference.

As shown in FIGS. 3A to 4A, the correction optical path 108 is formed outside the effective reading range between the light emitting element housing chamber 203 and the effective reading range in plan view. The correction optical path 108 is not formed in the effective reading range E. Therefore, the light having passed through the correction optical path 108 is not incident on the image sensor in the effective reading range E. Therefore, the light having passed through the correction optical path 108 has no effect on the image reading in the effective reading range E.

A specific method of the correction will now be described. After manufacture of the image sensor unit 1a, such as at the time of shipment from the factory, the image sensor unit 1a is activated, and the intensity of the light that is incident on the image sensor 15 via the correction optical path 108 is detected. The detected light intensity is stored in a memory mounted on the image sensor substrate 14 as correction data. After the image sensor unit 1a starts being used, the intensity of the light that is incident on the image sensor 15 via the correction optical path 108 is regularly detected (for example, each time the image sensor unit 1a is activated). The detected light intensity is compared with the correction data, and the irradiation intensity of the light from the light emitting element 31a is corrected so that the detected light intensity agrees with the correction data. Alternatively, the correction may be periodically made during operation of the image sensor unit 1a. Such a configuration is suitable for a case where the irradiation intensity of the light from the light emitting element 31a varies with the environmental temperature.

Image Sensor Unit (Second Embodiment)

Figure 5:
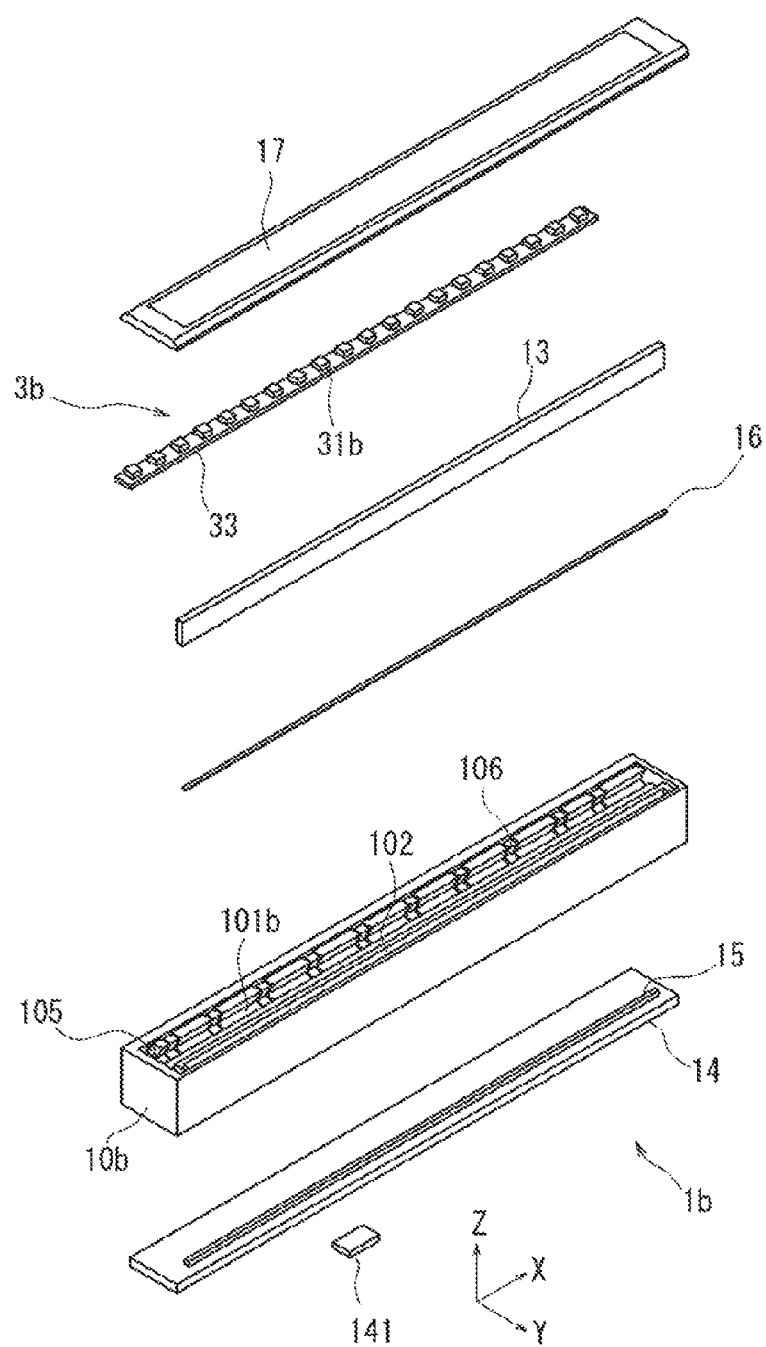
FIG. 5 is an exploded perspective view schematically showing a configuration example of an image sensor unit according to a second embodiment.
Figure 6:
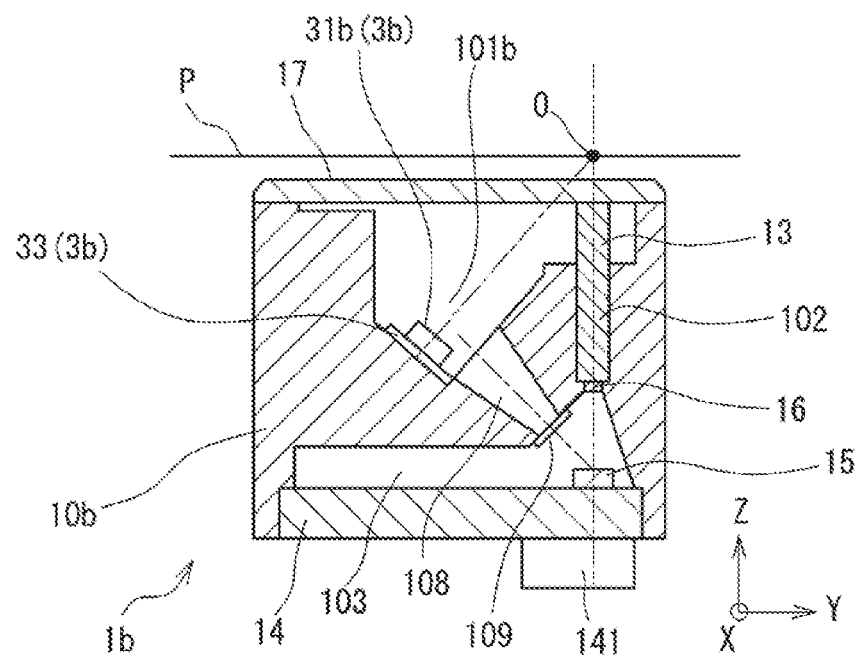
FIG. 6 is a cross-sectional view schematically showing the configuration example of the image sensor unit according to the second image sensor unit.

In the first embodiment described above, the image sensor unit 1a has the light guide 32. However, the light guide 32 may be omitted. Next, a configuration example of an image sensor unit 1b that does not have the light guide 32 according to a second embodiment will be described with reference to FIGS. 5 and 6. FIG. 5 is an exploded perspective view schematically showing the configuration example of the image sensor unit 1b according to the second embodiment, which corresponds to FIG. 1 showing the first embodiment. FIG. 6 is a cross-sectional view schematically showing the configuration example of the image sensor unit 1b, which corresponds to FIG. 4A showing the first embodiment.

As shown in FIG. 5, the image sensor unit 1b according to the second embodiment differs from the image sensor unit 1a according to the first embodiment in configuration of a linear light source 3b and a linear light source housing chamber 101b. In other respects, the configuration of the image sensor unit 1b according to the second embodiment can be the same as that of the image sensor unit 1a according to the first embodiment.

The linear light source 3b has a wiring board 33 having a band-like shape elongated in the main-scan direction and a plurality of light emitting elements 31b mounted on an upper surface of the wiring board 33. The wiring board 33 may be any of various known rigid boards or flexible boards. The light emitting element 31b may be a surface-mount light emitting element that emits light of predetermined colors (red (R), green (G), blue (B), infrared light (Ir) and ultraviolet light (UV)), for example. For example, the light emitting element 31b may be a surface-mount LED package having LED elements that emit the light of the colors (wavelength ranges) described above. As in the first embodiment, the colors (wavelength ranges) of the light emitted by the light emitting element 31b are not limited to the combination described above. As shown in FIG. 5, the plurality of light emitting elements 31b are mounted on the upper surface of the wiring board 33 in a linear arrangement in the longitudinal direction (main-scan direction). If the light emitting elements 31b emit light of different colors, the light emitting elements 31b of the different colors are cyclically mounted in a linear arrangement in the longitudinal direction.

The linear light source housing chamber 101b of a frame 10b is a space that is elongated in the main-scan direction and is open at the upper side, as with the light guide housing chamber 202 in the first embodiment. The configuration of the linear light source housing chamber 101b is not particularly limited, and it is essential only that the linear light source housing chamber 101b can house the linear light source 3b with the plurality of light emitting elements 31b oriented in a linear arrangement in the main-scan direction.

As shown in FIG. 6, the linear light source 3b is housed in the linear light source housing chamber 101b of the frame 10b. In this state, at least one of the plurality of light emitting elements 31b included in the linear light source 3b is positioned outside the effective reading range E. In particular, at least one of the plurality of light emitting elements 31b is preferably aligned with the opening of the correction optical path 108 in the sub-scan direction. With such a configuration, the light emitted by the light emitting element 31b passes through the correction optical path 108 and is directly incident on the image sensor 15 without passing through the light condenser 13 and the filter 16. In the second embodiment, as in the first embodiment, the irradiation intensity of the light from the light emitting elements 31b included in the linear light source 3b is corrected based on the light that is incident on the image sensor 15 via the correction optical path 108. In this way, according to the second embodiment, the light emitted by part of the light emitting elements 31b of the linear light source 3b is used to estimate (predict) and compensate for the deterioration of the other light emitting elements 31b.

(Paper Sheet Distinguishing Apparatus)

Figure 7:
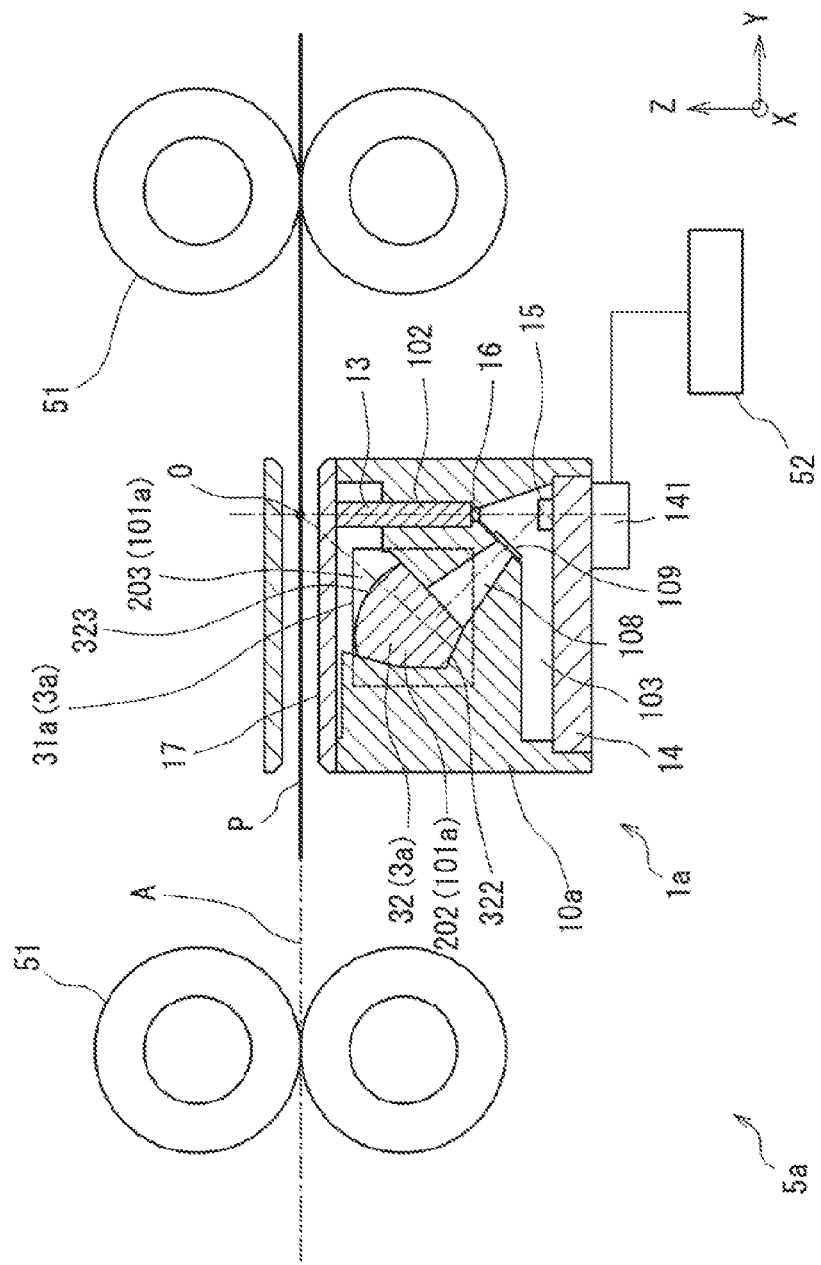
FIG. 7 is a cross-sectional view schematically showing a configuration example of essential parts of a paper sheet distinguishing apparatus.
Figure 8:
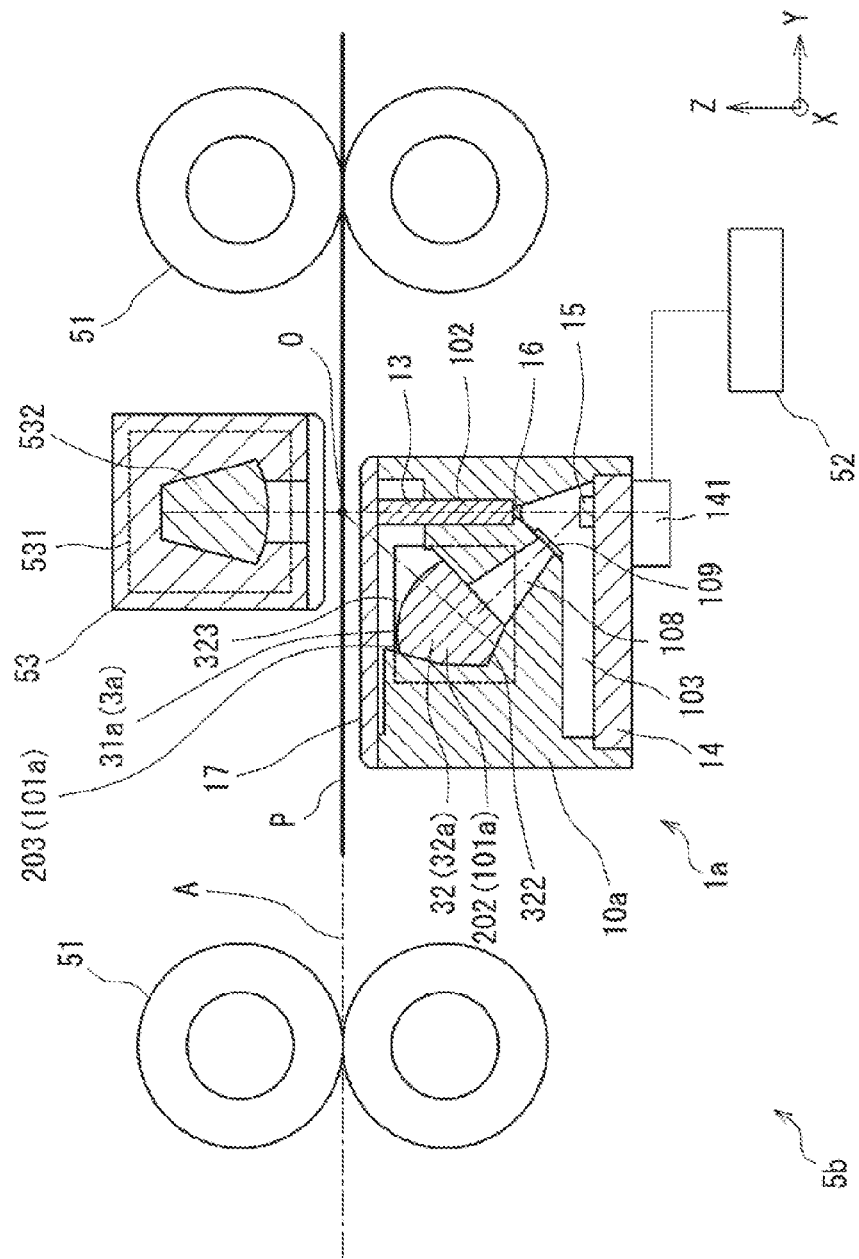
FIG. 8 is a cross-sectional view schematically showing a configuration example of essential parts of a paper sheet distinguishing apparatus.
Figure 9:
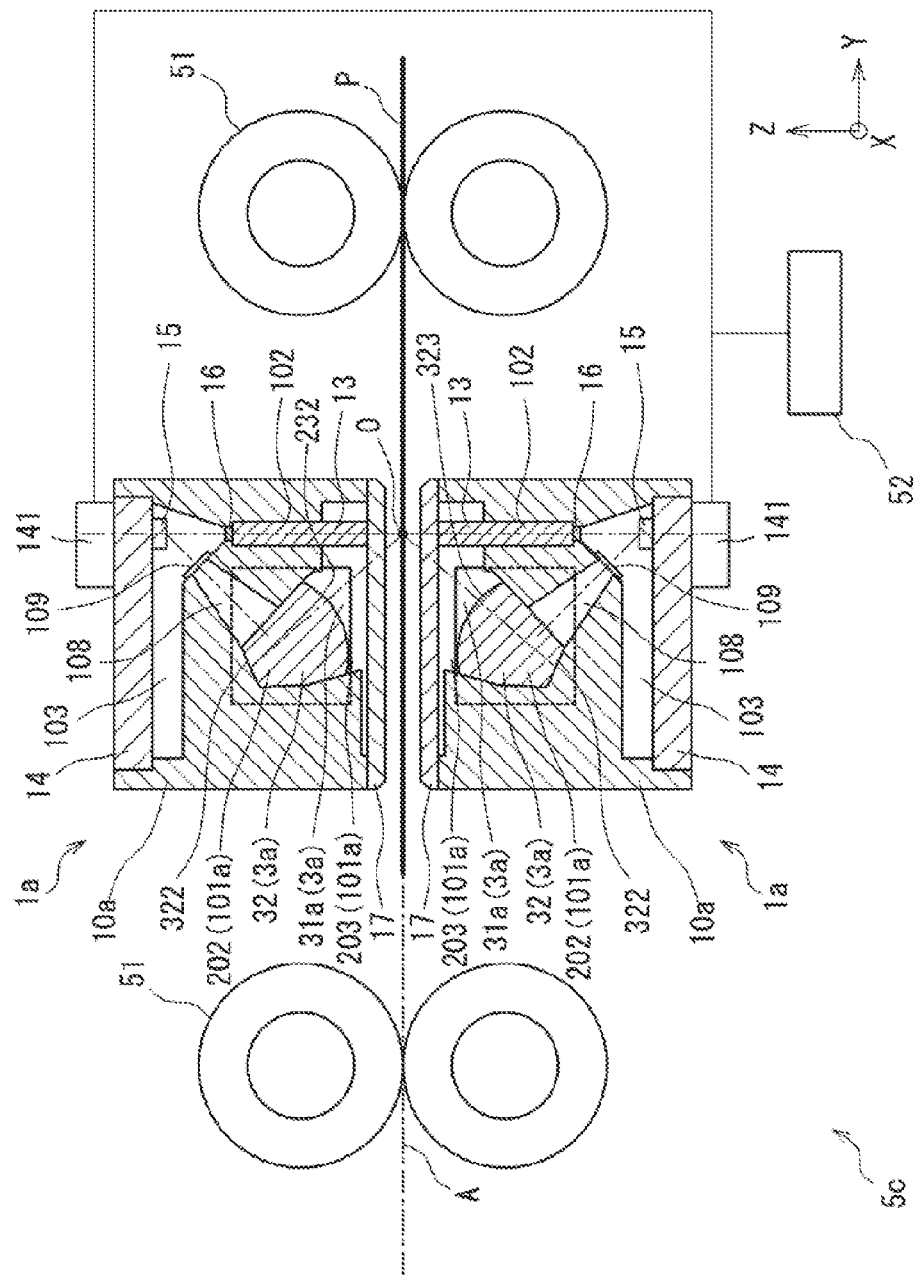
FIG. 9 is a cross-sectional view schematically showing a configuration example of essential parts of a paper sheet distinguishing apparatus.

Paper sheet distinguishing apparatuses 5a to 5c that incorporate the image sensor unit 1a or 1b will be described with reference to FIGS. 7 to 9. FIGS. 7 to 9 are cross-sectional views schematically showing a configuration of essential portions of the paper sheet distinguishing apparatuses 5a to 5c, which are taken along a plane perpendicular to the main-scan direction. Although FIGS. 7 to 9 show configuration examples in which the image sensor unit 1a according to the first embodiment is used, the image sensor unit 1b according to the second embodiment can be equally used. The paper sheet distinguishing apparatuses 5a to 5c irradiate a bill or the like, which is the object P to be illuminated, with light and reads the light from the bill to discriminate the type of the bill or authenticate the bill based on the read light. The light emitting elements 31a and 31b of the linear light sources 3a and 3b of the image sensor units 1a and 1b incorporated in the paper sheet distinguishing apparatuses 5a to 5c include a light emitting element that emits visible light, a light emitting element that emits infrared light and a light emitting element that emits ultraviolet light.

As shown in FIG. 7, the paper sheet distinguishing apparatus 5a includes the image sensor unit 1a or 1b, conveyor rollers 51 that convey the bill, and an image distinguishing portion 52 serving as distinguishing means connected by wire to the connector 141. In the paper sheet distinguishing apparatus 5a, a conveyance path A is set along which the bill held between the conveyor rollers 51 is conveyed over the image sensor unit 1a or 1b in a reading direction (sub-scan direction) with the cover member 17 interposed therebetween. An upper focal point (focal point on the side of the bill) of the light condenser 13 is set at the middle of the conveyance path A in the vertical direction.

The paper sheet distinguishing apparatus 5a configured as described above operates as described below. The image sensor unit 1a or 1b incorporated in the paper sheet distinguishing apparatus 5a reads the predetermined pattern on the bill as a visible light image by the operation described above. Furthermore, the image sensor unit 1a or 1b reads an infrared light image of the bill and an ultraviolet light image of the bill. After that, the image distinguishing portion 52 determines the authenticity of the bill by comparing the visible light image, the infrared light image and the ultraviolet light image of the bill to be authenticated with genuine bill images, which are obtained by irradiating a prepared genuine bill with visible light, infrared light and ultraviolet light. This is because the genuine bill has a part that provides different images under visible light, infrared light and ultraviolet light. The components that are not described here or shown in the drawing can be the same as those of a conventional paper sheet distinguishing apparatus. As an alternative, the image distinguishing portion 52 may be provided on the image sensor substrate 14.

The paper sheet distinguishing apparatus 5b shown in FIG. 8 further has a transmission light source device 53. The transmission light source device 53 has a light emitting element 531 and a light guide 532 that serve as a linear light source. The light emitting element 531 and the light guide 532 of the transmission light source device 53 may have the same configuration as the light emitting element 31a and the light guide 32 of the linear light source 3a of the image sensor unit 1a or 1b. Alternatively, the transmission light source device 53 may include a plurality of light emitting elements and a wiring board on which the plurality of light emitting elements are mounted, as with the linear light source 3b in the second embodiment. As shown in FIG. 8, the transmission light source device 53 is disposed to be opposed to the image sensor unit 1a or 1b and emits light to the bill. In particular, the transmission light source device 53 is disposed so that the optical axis of the light emitted from an emission surface of the light guide 532 and the optical axis of the light condenser 13 of the image sensor unit 1a or 1b agree with each other.

The paper sheet distinguishing apparatus 5b configured as described above operates as described below. The light emitting element 31a or 31b of the linear light source 3a or 3b incorporated in the image sensor unit 1a or 1b and the light emitting element 531 of the transmission light source device successively turn on the light emitting elements that emit visible light of different colors, infrared light and ultraviolet light. The light (visible light, infrared light and ultraviolet light) emitted to the bill from the light guide 32 of the image sensor unit 1a or 1b is reflected by the surface of the bill and is incident on the light condenser 13 and then is focused on the surface of the image sensor 15. The image sensor 15 converts the focused optical image into an electric signal to generate image data on the visible light image, the infrared light image and the ultraviolet light image formed from the reflected light from the bill. On the other hand, the light emitted to the bill from the transmission light source device 53 is transmitted through the bill and is incident on the light condenser 13 of the image sensor unit 1a or 1b and then is focused on the surface of the image sensor 15. The image sensor 15 converts the focused optical image into an electric signal to generate image data on the visible light image, the infrared light image and the ultraviolet light image formed from the transmitted light from the bill The light emitting element 31a or 31b of the image sensor unit 1a or 1b and the transmission light source device 53 repeat in a short time the operation of irradiating the bill with light and detecting the reflected light or the transmitted light in an alternating manner. By this operation, the image sensor unit 1a or 1b reads the predetermined pattern (a hologram, for example) on the bill as the visible light image and reads the infrared light image and the ultraviolet light image of the bill. With such a configuration, the paper sheet distinguishing apparatus 5b can read the visible light image, the infrared light image and the ultraviolet light image of the bill formed from the reflected light and the transmitted light.

The paper sheet distinguishing apparatus 5c shown in FIG. 9 has a pair of image sensor units 1a or 1b. As shown in FIG. 9, the image sensor units 1a or 1b are disposed to be opposed to each other with the conveyance path A for the bill interposed therebetween. The pair of image sensor units 1a or 1b is arranged so that the light emitted by the linear light source 3a or 3b of one of the image sensor units 1a or 1b and transmitted through the bill is incident on the light condenser 13 of the other image sensor unit 1a or 1b.

The paper sheet distinguishing apparatus 5c configured as described above operates as described below. The linear light sources 3a or 3b incorporated in the pair of image sensor units 1a or 1b successively turn on the light emitting elements that emit visible light of different colors, infrared light and ultraviolet light. The light emitted to the bill from the linear light source 3a or 3b of one of the image sensor units 1a or 1b is reflected from the surface of the bill, is incident on the light condenser 13 of the image sensor unit 1a or 1b, and is focused on the surface of the image sensor 15 of the image sensor unit 1a or 1b. The image sensor 15 converts the focused optical image into an electric signal to obtain the visible light image, the infrared light image and the ultraviolet light image formed from the reflected light from the bill. The light emitted to the bill from the linear light source 3a or 3b of the image sensor unit 1a or 1b is also transmitted through the bill, is incident on the light condenser 13 of the other image sensor unit 1a or 1b, and is focused on the surface of the image sensor 15 of the other image sensor unit 1a or 1b. The image sensor 15 of the other image sensor unit 1a or 1b converts the focused optical image into an electric signal to obtain the visible light image, the infrared light image and the ultraviolet light image formed from the transmitted light from the bill. With such a configuration, the paper sheet distinguishing apparatus 5c can read the reflection images of both the surfaces of the bill and read the transmission image.

Although visible light, infrared light and ultraviolet light are emitted to read the bill as a visible light image, an infrared light image and an ultraviolet light image in the configuration according to this embodiment, the present invention is not limited to this configuration. For example, a configuration in which only one or two of the visible light, the infrared light and the ultraviolet light are emitted is also possible. In addition, although the bill is used as the object P to be illuminated in the configuration described above, the type of the paper sheet is not particularly limited. For example, a wide variety of securities or ID cards can also be read.

Image Reading Apparatus (First Example)

Figure 10:
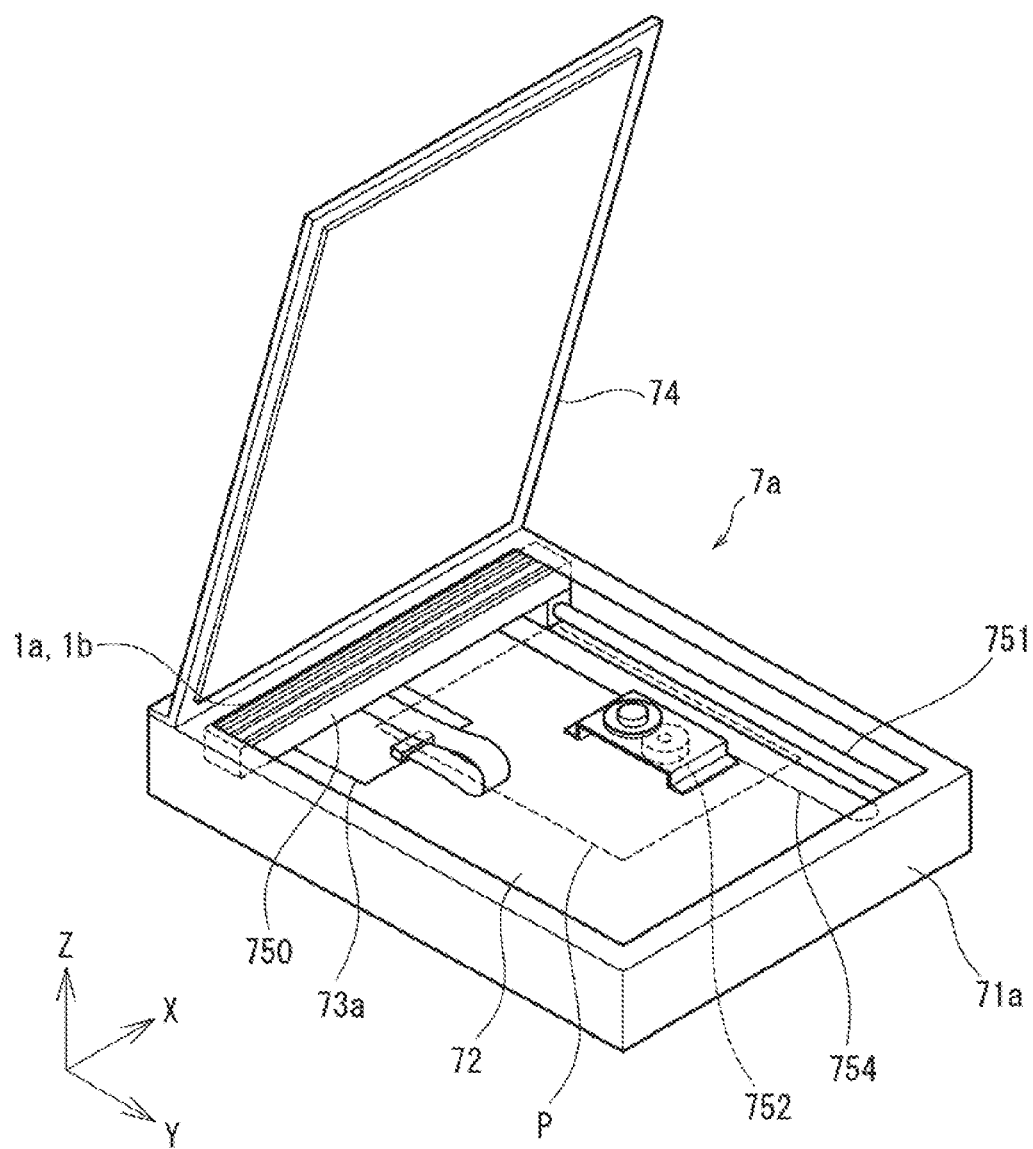
FIG. 10 is an external perspective view schematically showing a configuration example of an image reading apparatus.

FIG. 10 is a perspective view showing a configuration of a flat-bed type scanner 7a as the image reading apparatus. The scanner 7a includes a housing 71a, a platen glass 72 serving as an illuminated object placement portion, an image sensor unit 1a or 1b, a driving mechanism that drives the image sensor unit 1a or 1b, a circuit board 73a and a platen cover 74. The platen glass 72 serving as the illuminated object placement portion is made from a transparent plate, such as glass, and is attached to an upper surface of the housing 71a. The platen cover 74 is attached to the housing 71a by a hinge mechanism so that the platen cover 74 can be opened and closed to cover the object P to be illuminated placed on the platen glass 72. The image sensor unit 1a or 1b, the driving mechanism that drives the image sensor unit 1a or 1b and the circuit board 73a are housed in the housing 71a. Since the scanner 7a has the platen glass 72, the image sensor unit 1a or 1b does not have to have the cover member 17.

The driving mechanism includes a holding member 750, a guide shaft 751, a drive motor 752 and a wire 754. The holding member 750 surrounds and holds the image sensor unit 1a or 1b. The guide shaft 751 guides the holding member 750 moving along the platen glass 72 in the reading direction (sub-scan direction). The drive motor 752 and the holding member 750 are coupled to each other by the wire 754, and the driving force of the drive motor 752 makes the holding member 750 holding the image sensor unit 1a or 1b move in the sub-scan direction. The image sensor unit 1a or 1b reads an original or other illuminated object P placed on the platen glass 72 while being moved in the sub-scan direction by the driving force of the drive motor 752. In this way, the image sensor unit 1a or 1b reads the illuminated object P while moving with respect to the illuminated object P.

An image processing circuit that performs a predetermined image processing on the image read by the image sensor unit 1a or 1b, a controlling circuit that controls the parts of the scanner 7a including the image sensor unit 1a or 1b, or a power supply circuit that supplies electric power to the parts of the scanner 7a is built on the circuit board 73a, for example.

Image Reading Apparatus (Second Example)

Figure 11:
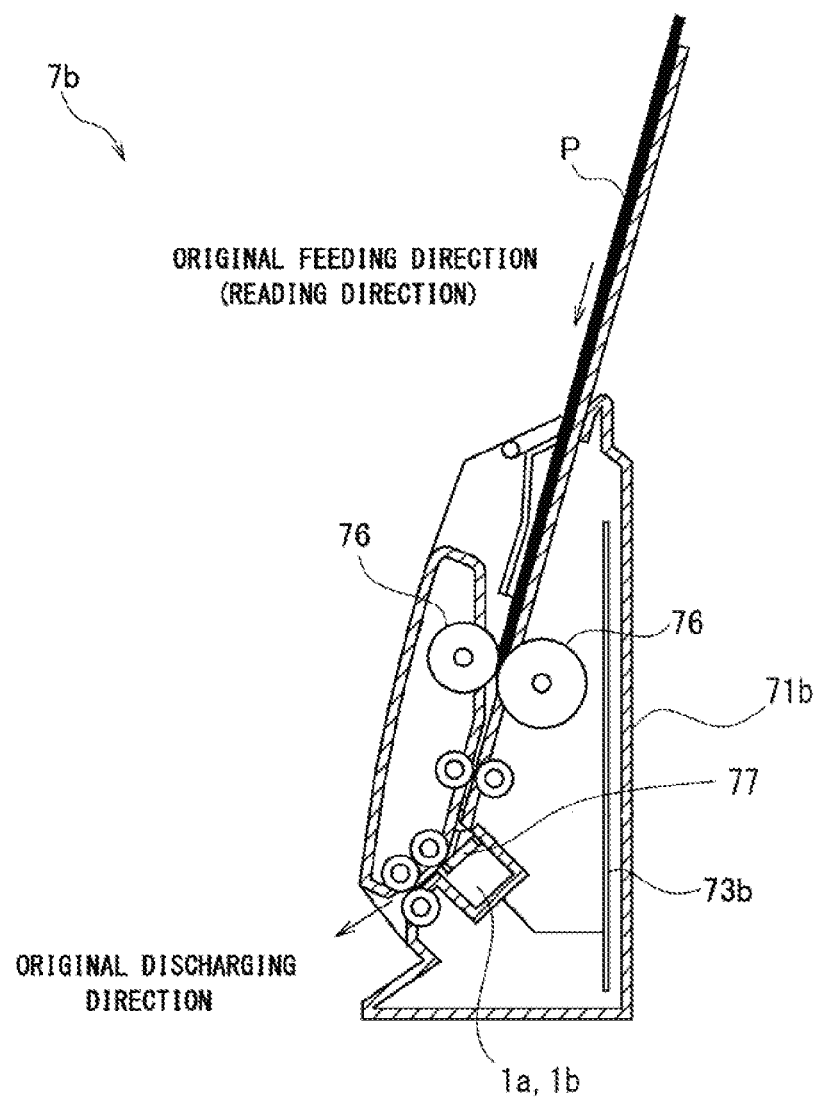
FIG. 11 is a cross-sectional view schematically showing a configuration example of an image reading apparatus.

FIG. 11 is a schematic cross-sectional view showing a configuration of a sheet-feed type scanner 7b serving as the image reading apparatus. As shown in FIG. 11, the scanner 7b includes a housing 71b, an image sensor unit 1a or 1b, conveyor rollers 76, a circuit board 73b and a cover glass 77. The conveyor rollers 76 are rotated by a driving mechanism (not shown) and hold and convey the object P to be illuminated. The cover glass 77 is provided to cover the upper side of the image sensor unit 1a or 1b. A controlling circuit that controls the parts of the scanner 7b including the image sensor unit 1a or 1b or a power supply circuit that supplies electric power to the parts of the scanner 7b is built on the circuit board 73b, for example.

In the scanner 7b, the image sensor unit 1a or 1b reads the illuminated object P while the illuminated object P is conveyed by the conveyor rollers 76 in the reading direction (sub-scan direction). That is, the image sensor unit 1a or 1b reads the illuminated object P while moving with respect to the illuminated object P. Although FIG. 11 shows an example of the scanner 7b that reads one side of the illuminated object P, two image sensor units 1a or 1b may be provided to be opposed to each other with the conveyance path A for the illuminated object P interposed therebetween, and both the sides of the illuminated object P may be read.

Although the scanners 7a and 7b have been described as examples of the image reading apparatus incorporating the image sensor unit 1a or 1b according to the present invention with reference to FIGS. 10 and 11, the image reading apparatus incorporating the image sensor unit 1a or 1b is not limited to these configurations and types.

(Image Forming Apparatus)

Figure 12:
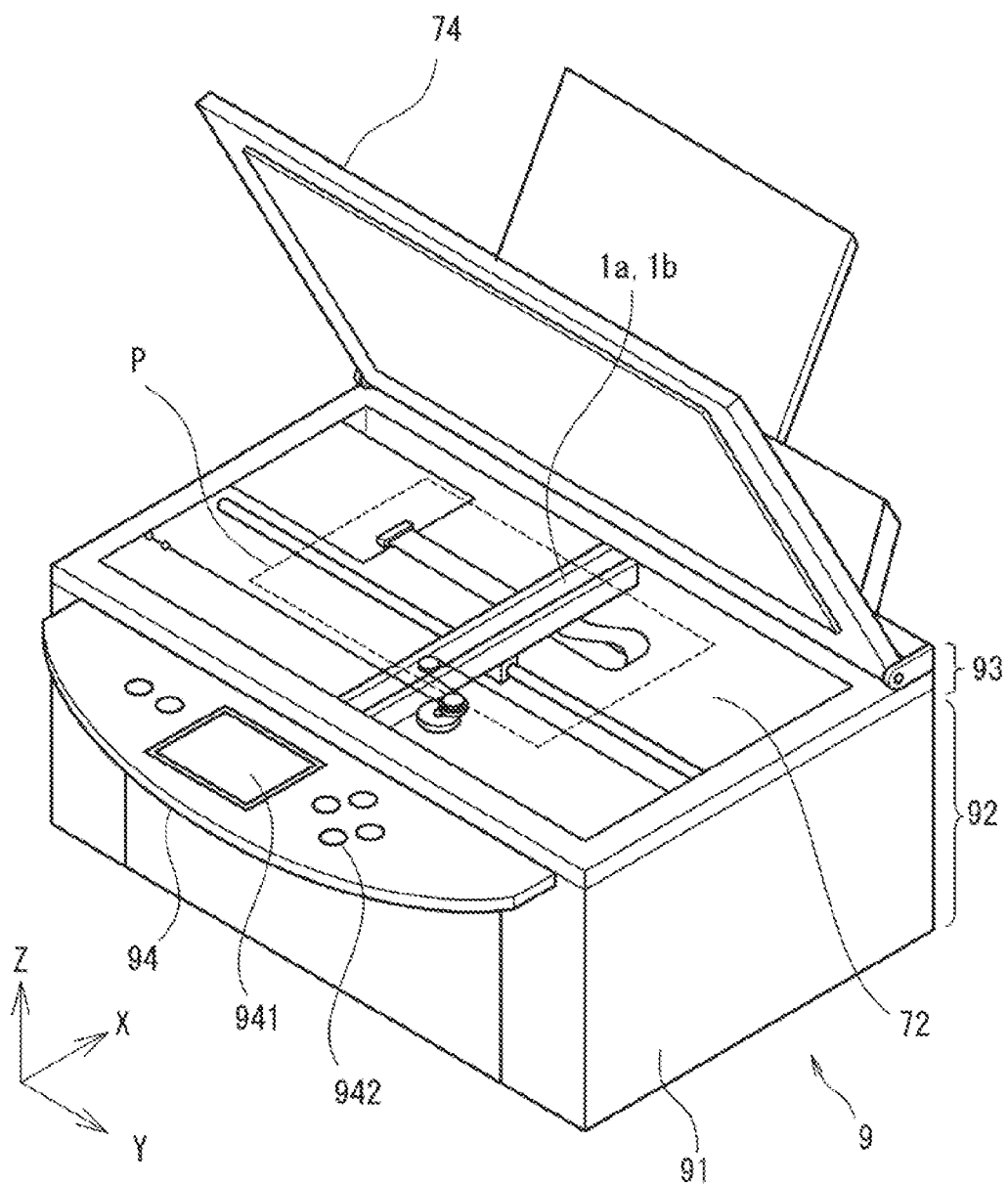
FIG. 12 is an external perspective view schematically showing a configuration example of an image forming apparatus.
Figure 13:
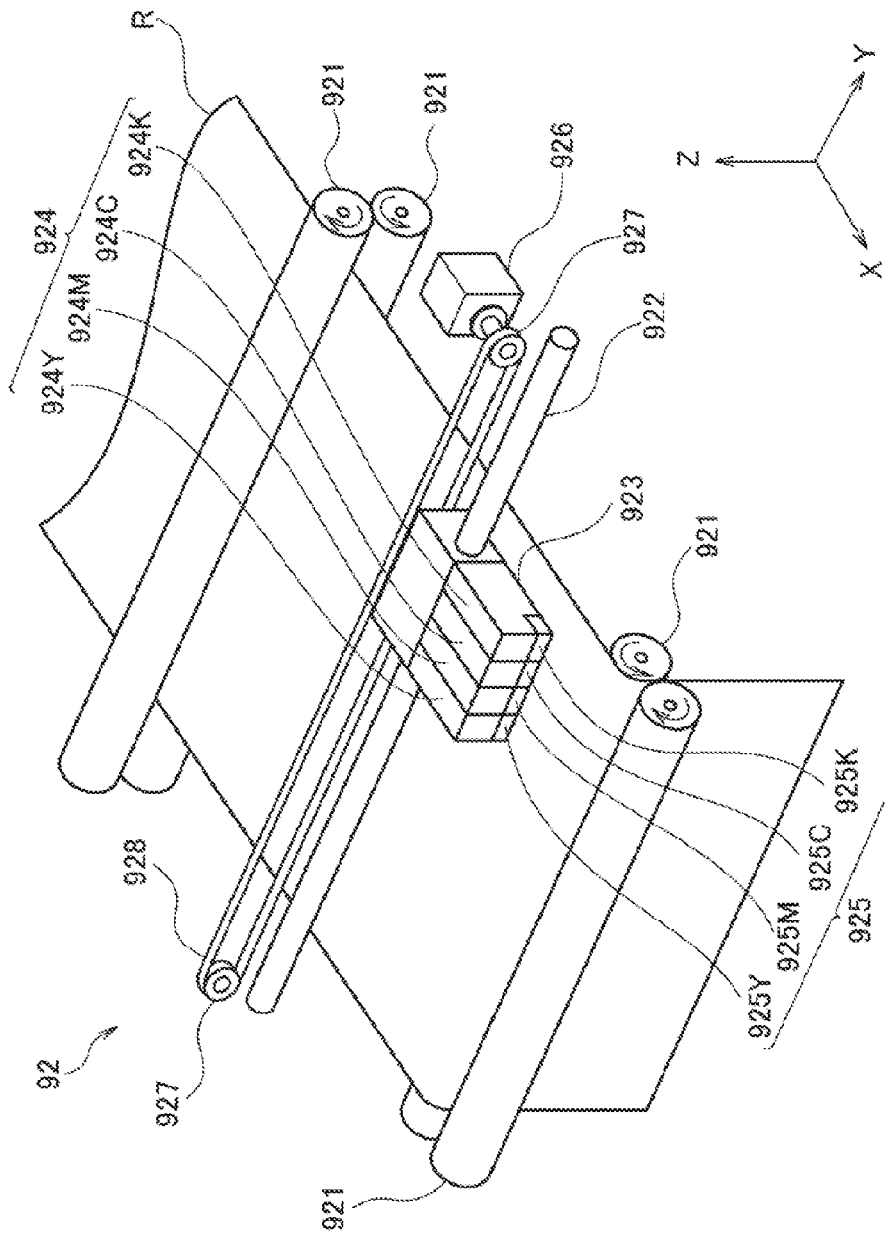
FIG. 13 is a diagram schematically showing a configuration of an image forming portion of the image forming apparatus.

Next, a configuration example of an image forming apparatus 9 according to an embodiment of the present invention will be described with reference to FIGS. 12 and 13. The image forming apparatus 9 according to this embodiment of the present invention incorporates the image sensor unit 1a or 1b according to another embodiment of the present invention. FIG. 12 is an external perspective view of the image forming apparatus 9 according to this embodiment. FIG. 13 is a perspective view of an image forming portion 92 provided in a housing 91 of the image forming apparatus 9 according to this embodiment of the present invention. As shown in FIGS. 12 and 13, the image forming apparatus 9 is a multifunction printer (MFP) that doubles as a flat-bed type scanner and an inkjet-type printer. The image forming apparatus 9 includes an image reading portion 93 serving as image reading means that reads an image and the image forming portion 92 serving as image forming means that forms an image. The image reading portion 93 of the image forming apparatus 9 incorporates the image sensor unit 1a or 1b. The image reading portion 93 of the image forming apparatus 9 may have the same configuration as the image reading apparatus described above. Therefore, redundant descriptions of the same portions as those of the image reading apparatus will be omitted.

As shown in FIG. 12, the image forming apparatus 9 has an operation portion 94. The operation portion includes a display portion 941 on which an operation menu or various messages are displayed and various operation buttons 942 used to operate the image forming apparatus 9. As shown in FIG. 13, the image forming portion 92 is provided in the housing of the image forming apparatus 9. The image forming portion 92 includes conveyor rollers 921, a guide shaft 922, an inkjet cartridge 923, a motor 926 and a pair of timing pulleys 927. The conveyor rollers 921 are rotated by the driving force of a driving source and convey printing paper R, which is a recording medium, in the sub-scan direction. The guide shaft 922 is a rod-shaped member and is fixed to the housing 91 of the image forming apparatus 9 so that the axis thereof is parallel to the main-scan direction of the printing paper R.

The inkjet cartridge 923 can reciprocate in the main-scan direction of the printing paper R by sliding on the guide shaft 922. The inkjet cartridge 923 includes ink tanks 924 (924C, 924M, 924Y and 924K) containing cyan C ink, magenta M ink, yellow Y ink and black K ink and discharge heads 925 (925C, 925M, 925Y and 925K) provided for the ink tanks 924. One of the pair of timing pulleys 927 is attached to a rotating shaft of the motor 926. The pair of timing pulleys 927 are provided at positions spaced apart from each other in the main-scan direction of the printing paper R. A timing belt 928 is wound around the pair of timing pulleys 927 in parallel with the timing pulleys 927 and is coupled to the inkjet cartridge 923 at a predetermined point.

The image reading portion 93 of the image forming apparatus 9 converts the image read by the image sensor unit 1a or 1b into an electric signal of a format suitable for printing. Based on the electric signal resulting from the conversion by the image sensor unit 1a or 1b of the image reading portion 93, the conveyor rollers 921, the motor 926 and the inkjet cartridge 823 of the image forming portion 92 of the image forming apparatus 9 are driven, and the image forming portion 92 of the image forming apparatus 9 forms an image on the printing paper R. The image forming portion 92 of the image forming apparatus 9 can also form an image based on an externally input electric signal. The configuration and operation of the image forming portion 92 of the image forming apparatus 9 may be the same as those of various conventionally known printers. Therefore, detailed descriptions thereof will be omitted. Although the inkjet-type image forming apparatus has been described as an example of the image forming portion 92, any type of image forming apparatus, such as an electrophotographic type, a thermal transfer type or a dot impact type, can be used.

Although embodiments and examples of the present invention have been described in detail, the embodiments and examples described above are intended only to illustrate specific examples of implementations of the present invention. The technical scope of the present invention is not limited to the embodiments and examples described above. Various modifications can be made to the embodiments and examples without departing from the spirit of the present invention.

For example, the image reading apparatus according to the present invention is not limited to the image scanner having the configurations according to the embodiments described above. The image forming apparatus is not limited to the inkjet type but can be of any type, such as the electrophotographic type, the thermal transfer type or the dot impact type. Furthermore, the image forming apparatus is not limited to the multifunction printer according to the embodiment described above. A copying machine and a facsimile that incorporates the image sensor unit according to the present invention are also included in the image reading apparatuses according to the present invention.

The present invention can be advantageously applied to an image sensor unit and an image reading apparatus and an image forming apparatus (an image scanner, a facsimile, a copying machine, a multifunction printer, for example) that incorporate the image sensor unit.

According to the present invention, the light emitted from the light guide can be directly guided to the image sensor. Therefore, data used for correction can be obtained from the light, and any member serving as a white reference is not needed.

What is claimed is:

1. An image sensor unit that irradiates an object to be illuminated with light and detects light from the illuminated object, comprising:
   a light source;
   a rod-like light guide;
   a light condenser that focuses the light from the illuminated object;
   an image sensor that receives and reads light from the light condenser, the image sensor including a plurality of image sensing elements; and
   a frame that houses the light source, the rod-like light guide, and the image sensor, the frame including:
   a light source housing chamber;
   a rod-like light guide housing chamber;
   an image sensor housing chamber; and
   a hole that connects the rod-like light guide housing chamber and the image sensor housing chamber to each other,
   wherein the plurality of image sensing elements include image sensing elements positioned inside an effective reading region and image sensing elements positioned outside the effective reading region, and the image sensing elements positioned outside the effective reading region receive light passed through the hole that connects the rod-like light guide housing chamber and the image sensor housing chamber to each other, and
   wherein the effective reading region is a region in plan view in which an image of the illuminated object is read, and the hole that connects the rod-like light guide housing chamber and the image sensor housing chamber to each other is provided outside the effective reading region in plan view.

2. The image sensor unit according to claim 1, wherein the hole is provided with a transparent member.

3. The image sensor unit according to claim 1, wherein the light source is provided outside of the effective reading region.

4. The image sensor unit according to claim 1, wherein the light source includes:
   a light emitting element, and
   the rod-like light guide shapes light emitted by the light emitting element into a line.

5. The image sensor unit according to claim 4, wherein the rod-like light guide and the image sensor are each partially provided outside the effective reading region, and
   the hole is provided between the light emitting element and the effective reading region in plan view.

6. The image sensor unit according to claim 1, wherein the light source includes:
   a plurality of light emitting elements; and
   a wiring board on which the plurality of light emitting elements are mounted in a linear arrangement.

7. The image sensor unit according to claim 1, wherein the light source includes a light emitting element that emits infrared light.

8. The image sensor unit according to claim 1, wherein the light source includes a light emitting element that emits light of a predetermined wavelength, and
   a filter that cuts the light of the predetermined wavelength is provided on a hole between the illuminated object and the image sensor.

9. The image sensor unit according to claim 8, wherein the light of the predetermined wavelength is ultraviolet light.

10. The image sensor unit according to claim 1, wherein the plurality of image sensing elements are arranged in a line.

11. A paper sheet distinguishing apparatus that reads reflected light from an illuminated object while an image sensor unit and the illuminated object are moving with respect to each other and determines the authenticity of the illuminated object,
- wherein the image sensor unit includes:
- a light source;
- a rod-like light guide;
- a light condenser that focuses the light from the illuminated object;
- an image sensor that receives and reads light from the light condenser, the image sensor including a plurality of image sensing elements; and
- a frame that houses the light source, the rod-like light guide, and the image sensor, the frame including:
- a light source housing chamber;
- a rod-like light guide housing chamber;
- an image sensor housing chamber; and
- a hole that connects the rod-like light guide housing chamber and the image sensor housing chamber to each other,
- wherein the plurality of image sensing elements include image sensing elements positioned inside an effective reading region and image sensing elements positioned outside the effective reading region, and the image sensing elements positioned outside the effective reading region receive light passed through the hole that connects the rod-like light guide housing chamber and the image sensor housing chamber to each other, and
- wherein the effective reading region is a region in plan view in which an image of the illuminated object is read, and the hole that connects the rod-like light guide housing chamber and the image sensor housing chamber to each other is provided outside the effective reading region in plan view.

12. An image reading apparatus that reads reflected light from an illuminated object while an image sensor unit and the illuminated object are moving with respect to each other,
- wherein the image sensor unit includes:
- a light source;
- a rod-like light guide;
- a light condenser that focuses the light from the illuminated object;
- an image sensor that receives and reads light from the light condenser, the image sensor including a plurality of image sensing elements; and
- a frame that houses the light source, the rod-like light guide, and the image sensor, the frame including:
- a light source housing chamber;
- a rod-like light guide housing chamber;
- an image sensor housing chamber; and
- a hole that connects the rod-like light guide housing chamber and the image sensor housing chamber to each other,
- wherein the plurality of image sensing elements include image sensing elements positioned inside an effective reading region and image sensing elements positioned outside the effective reading region, and the image sensing elements positioned outside the effective reading region receive light passed through the hole that connects the rod-like light guide housing chamber and the image sensor housing chamber to each other, and
- wherein the effective reading region is a region in plan view in which an image of the illuminated object is read, and the hole that connects the rod-like light guide housing chamber and the image sensor housing chamber to each other is provided outside the effective reading region in plan view.

* * * * *